US010775202B2

(12) United States Patent
Hermann

(10) Patent No.: US 10,775,202 B2
(45) Date of Patent: Sep. 15, 2020

(54) OPTICAL POSITION-MEASURING DEVICE COMPRISING TWO TRACKS EACH CONTAINING INCREMENTAL GRADUATIONS WITH INTEGRATED REFERENCE MARKS HAVING APERIODIC AND PERIODIC PORTIONS

(71) Applicant: Dr. JOHANNES HEIDENHAIN GmbH, Traunreut (DE)

(72) Inventor: Michael Hermann, Tacherting (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 76 days.

(21) Appl. No.: 16/276,636

(22) Filed: Feb. 15, 2019

(65) Prior Publication Data
US 2020/0025591 A1 Jan. 23, 2020

(30) Foreign Application Priority Data
Feb. 20, 2018 (DE) .................. 10 2018 202 556

(51) Int. Cl.
G01D 5/347 (2006.01)
G01D 5/244 (2006.01)

(52) U.S. Cl.
CPC ..... G01D 5/34746 (2013.01); G01D 5/24428 (2013.01); G01D 5/24438 (2013.01); G01D 5/34715 (2013.01)

(58) Field of Classification Search
CPC .............. G01D 5/34746; G01D 5/285; G01D 5/34715; G01D 5/366; G01D 5/38; G01D 5/24428; G01D 5/24438; G01B 11/00
(Continued)

(56) References Cited

U.S. PATENT DOCUMENTS 6,097,490 A * 8/2000 Holzapfel .............. G01D 5/366
  250/237 G
6,198,534 B1 * 3/2001 Hofer ................... G01D 5/2457
  250/237 G
(Continued)

FOREIGN PATENT DOCUMENTS

EP 1420229 A1 5/2004
EP 1724548 A2 11/2006
(Continued)

*Primary Examiner* — Que Tan Le
*Assistant Examiner* — Jennifer D Bennet
(74) *Attorney, Agent, or Firm* — Leydig, Voit & Mayer Ltd.

(57) ABSTRACT

An optical position-measuring device for determining the relative position of two objects includes two scanning units which are connected to one of the objects and each include a light source, one or more gratings and a detector assembly. A scale is connected to the other object and has two tracks each containing incremental graduations extending along a first one of the measurement directions. The incremental graduations each are composed of graduation regions which have different optical properties and are periodically arranged along an incremental graduation direction. The two incremental graduation directions form an angle of between 0° and 90° relative to each other. Each of the two incremental graduations has a reference mark integrated therein such that scanning of the reference mark allows a reference signal to be generated at a defined reference position along each of the measurement directions. The reference marks include both aperiodic and periodic portions.

15 Claims, 4 Drawing Sheets

(58) Field of Classification Search
USPC .................................................. 250/231.1
See application file for complete search history.

(56) References Cited

U.S. PATENT DOCUMENTS

| | | | |
|---|---|---|---|
| 2002/0011559 A1* | 1/2002 | Mayer | G01D 5/38 250/237 G |
| 2004/0245442 A1* | 12/2004 | Gruber | G01D 5/366 250/231.13 |
| 2008/0315076 A1* | 12/2008 | Kusano | G01D 5/34746 250/231.1 |
| 2011/0188055 A1 | 8/2011 | Hermann | |
| 2012/0292493 A1 | 11/2012 | Hermann | |
| 2014/0103914 A1 | 4/2014 | Kusumi et al. | |

FOREIGN PATENT DOCUMENTS

EP         2525195 A2    11/2012
EP         2318812 B1    11/2014

* cited by examiner

OPTICAL POSITION-MEASURING DEVICE COMPRISING TWO TRACKS EACH CONTAINING INCREMENTAL GRADUATIONS WITH INTEGRATED REFERENCE MARKS HAVING APERIODIC AND PERIODIC PORTIONS

CROSS-REFERENCE TO PRIOR APPLICATION

Priority is claimed to German Patent Application No. DE 10 2018 202 556.8, filed on Feb. 20, 2018, the entire disclosure of which is hereby incorporated by reference herein.

FIELD

The present invention relates to an optical position-measuring device suitable for determining with high accuracy the relative position of two objects that are movable relative to one another.

BACKGROUND

EP 1 724 548 A2 describes a position-measuring device suitable for determining the relative position of two objects that are movable relative to one another along at least two measurement directions. The position-measuring device includes a scanning head connected to one of the two objects as well as a scale connected to the other of the two objects. The scale has two tracks containing incremental graduations and extending along a first measurement direction, which is hereinafter also referred to as the principal measurement direction. The periodically arranged graduation regions of the two incremental graduations form an angle of between 0° and 90° relative to each other; i.e., the two incremental graduations are angularly oriented with respect to each other. By scanning the incremental graduation whose graduation regions are oriented perpendicular to the first measurement direction, it is possible to generate periodic incremental signals for relative position determination along the first or principal measurement direction. By scanning the incremental graduation that is oriented obliquely or angularly with respect thereto, it is possible to metrologically acquire further relative position information regarding a possibly resulting movement along a second measurement direction. EP 1 724 548 A2 provides for the angularly oriented incremental graduation to be arranged at an angle that may be between 0° and 90°; mention being made, inter alia, of an arrangement at an angle of 45°. Furthermore, a reference mark is associated with each of the two incremental graduations to be able to determine an absolute or reference position along the first measurement direction and also along the second measurement direction. When respective reference mark is passed over, it is then possible, for example, to set a counter to a predetermined absolute position value to which the subsequent incremental measurement will then be related. As for the configuration of the reference marks, the aforementioned publication only contains information on the dimension required to ensure reliable detection thereof during scanning. In addition to arranging the reference marks adjacent to the incremental graduations, mention is also made of the possibility of integrating the reference marks into the incremental graduations.

SUMMARY

In an embodiment, the present invention provides an optical position-measuring device for determining the relative position of two objects that are movable relative to one another along at least two measurement directions. The optical position-measuring device includes two scanning units which are connected to a first one of the two objects and each include at least one light source, one or more gratings and a detector assembly. A scale is connected to a second one of the two objects and has two tracks each containing incremental graduations extending along a first one of the measurement directions. The incremental graduations each are composed of graduation regions which have different optical properties and are periodically arranged along an incremental graduation direction. The two incremental graduation directions form an angle of between 0° and 90° relative to each other. Each of the two incremental graduations has at least one reference mark integrated therein such that scanning of the reference mark allows a reference signal to be generated at a defined reference position along each of the measurement directions. The reference marks include both aperiodic and periodic portions.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1A:
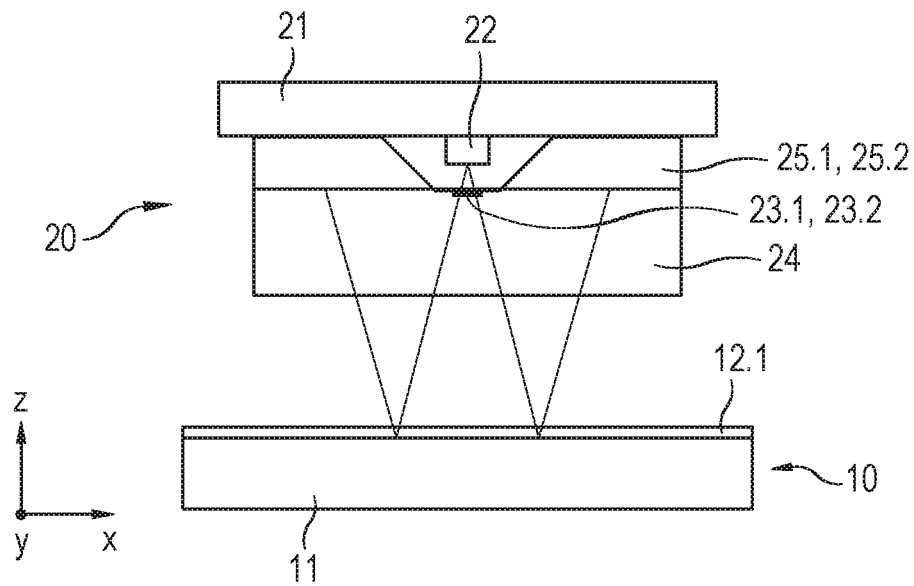
FIGS. 1a, 1b are schematic cross-sectional views showing the partial scanning beam path of a first exemplary embodiment of the inventive optical position-measuring device.

In an embodiment, the present invention provides an optical position-measuring device for high-accuracy position determination along at least two measurement directions that has two incremental graduations which have integrated reference marks and are angularly oriented with respect to each other. The generation of periodic incremental signals should be ensured even when the respective reference marks are passed over along the first measurement direction, and especially regardless of the position in which the scanning unit is located along the second measurement direction.

The optical position-measuring device according to an embodiment of the present invention serves to determine the relative position of two objects that are movable relative to one another along at least two measurement directions. It includes two scanning units which are connected to one of the two objects and each include at least one light source, one or more gratings as well as a detector assembly. Also provided is a scale which is connected to the other object and has two tracks containing incremental graduations and extending along a first measurement direction, the incremental graduations each being composed of graduation regions which have different optical properties and are periodically arranged along an incremental graduation direction. The two incremental graduation directions form an angle of between 0° and 90° relative to each other. Each of the two incremental graduations has at least one reference mark integrated therein, the scanning of which allows a reference signal to be generated at a defined reference position along each measurement direction. The reference mark includes both aperiodic and periodic portions.

Preferably, the reference mark is disposed in a sub-area of limited extent in the respective incremental graduation, the aperiodic and periodic portions of the reference mark being intermixed within this sub-area.

The sub-area may be rectangular in shape, and the longitudinal axis of the rectangle may be oriented perpendicular to the incremental graduation direction in the respective incremental graduation.

Furthermore, the rectangular reference mark may extend across the entire width of the track containing the respective incremental graduation.

In a possible embodiment, the aperiodic and periodic portions of the reference mark are configured spatially separately perpendicularly to the respective incremental graduation direction.

The periodic portion of the reference mark may have a first reference mark grating constant that is identical to the respective incremental graduation grating constant. The aperiodic portion of the reference mark may in each instance include a plurality of grating structures having a second reference mark grating constant that varies spatially along the incremental graduation direction.

Moreover, in such an embodiment, the aperiodic portion of the reference mark may in each instance include a plurality of mirror-symmetrically configured grating structures whose second reference mark grating constant increases from a central axis of symmetry symmetrically outwardly perpendicularly to the incremental graduation direction.

In this connection, the aperiodic portions of the reference mark may be periodically arranged perpendicularly to the incremental graduation direction with a third reference mark grating constant.

Preferably, the third reference mark grating constant is selected such that a displacement of a scanning unit perpendicular to the incremental graduation direction will not produce a signal change.

Moreover, provision may be made for the periodic and aperiodic portions of the reference mark to have a surface area ratio of 1:1.

In another possible embodiment, the periodic portion of the reference mark is integrated as a periodic superstructure into the aperiodic portion of the reference mark.

In this case, the periodic portion of the reference mark may have a reference mark fine grating constant that is equal to the incremental graduation grating constant of the respective incremental graduation. Furthermore, the aperiodic portion of the reference mark may be formed by two different reference mark regions which are alternately arranged along the incremental graduation direction with a reference mark coarse grating constant and each have different ratios of graduation region width to reference mark fine grating constant.

Furthermore, the differently configured reference mark regions may be aperiodically arranged along the incremental graduation direction and, starting at a central axis of symmetry, the reference mark regions may be arranged mirror-symmetrically and in each instance with outwardly increasing reference mark coarse grating constants.

Preferably, it is provided that:
a transmitting grating device is disposed in front of a divergently emitting light source in the scanning unit, the transmitting grating device being composed of a periodic transmission-type transmitting grating and a transmitting slit adjacent thereto, and the detector assembly includes an incremental signal detector as well as a reference signal detector.

Furthermore, it is advantageous for the scale to be in the form of a reflective scale and to have alternately arranged reflective graduation regions having different phase-shifting effects.

The optical position-measuring device according to an embodiment of the present invention has been found to be especially advantageous in that periodic incremental signals along one or more measurement directions are generally available even when the respective reference marks are passed over.

Moreover, it is ensured that an absolute position reference along the first and second measurement directions can be established from the relative movement of the scale and scanning units along the first direction of measurement alone.

Also, establishment of an absolute reference along the first and second measurement directions is ensured for any position of the scanning units along the second measurement direction.

Figure 1B:
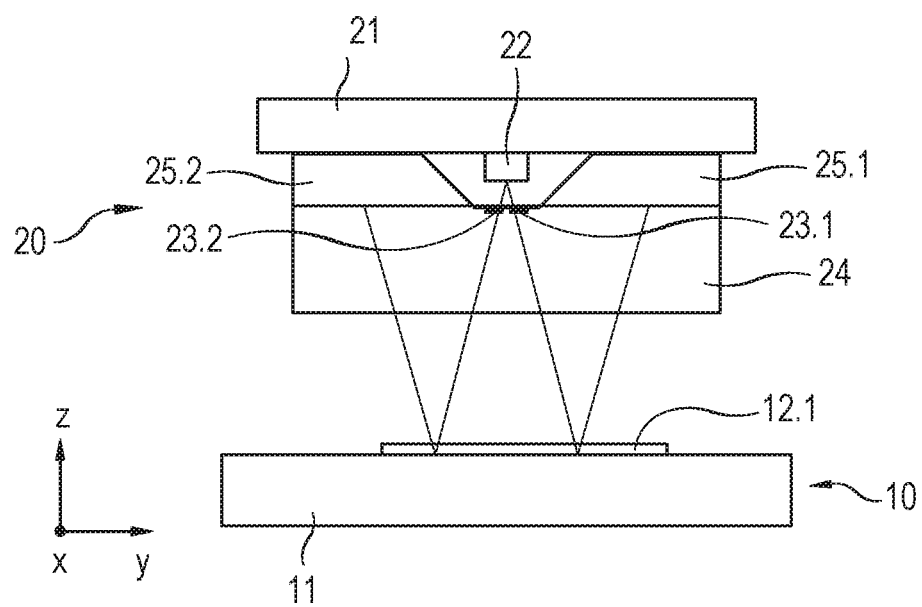
Figure 2:
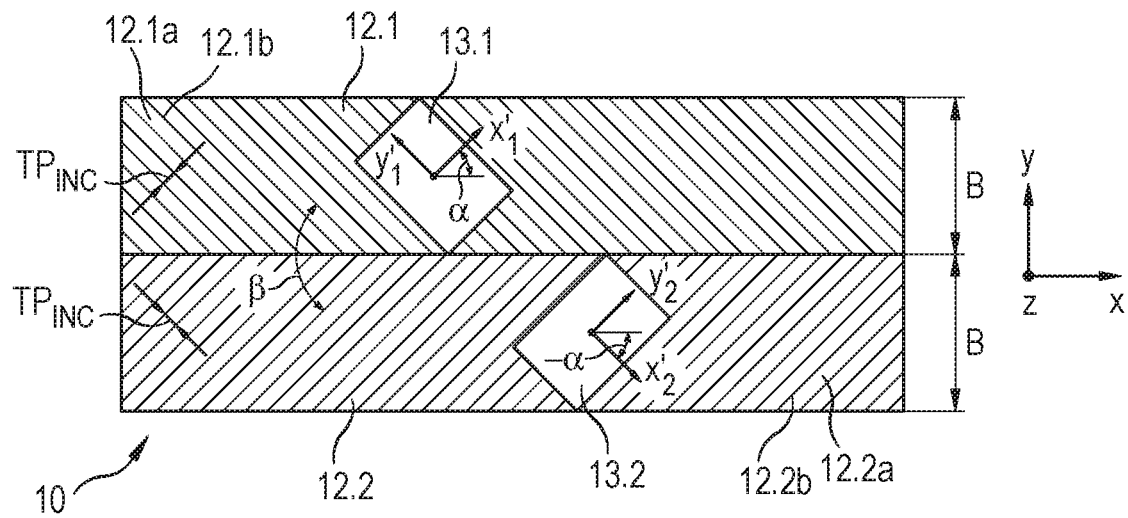
FIG. 2 is a partial plan view of the scale of the first exemplary embodiment of FIGS. 1a, 1b.
Figure 3:
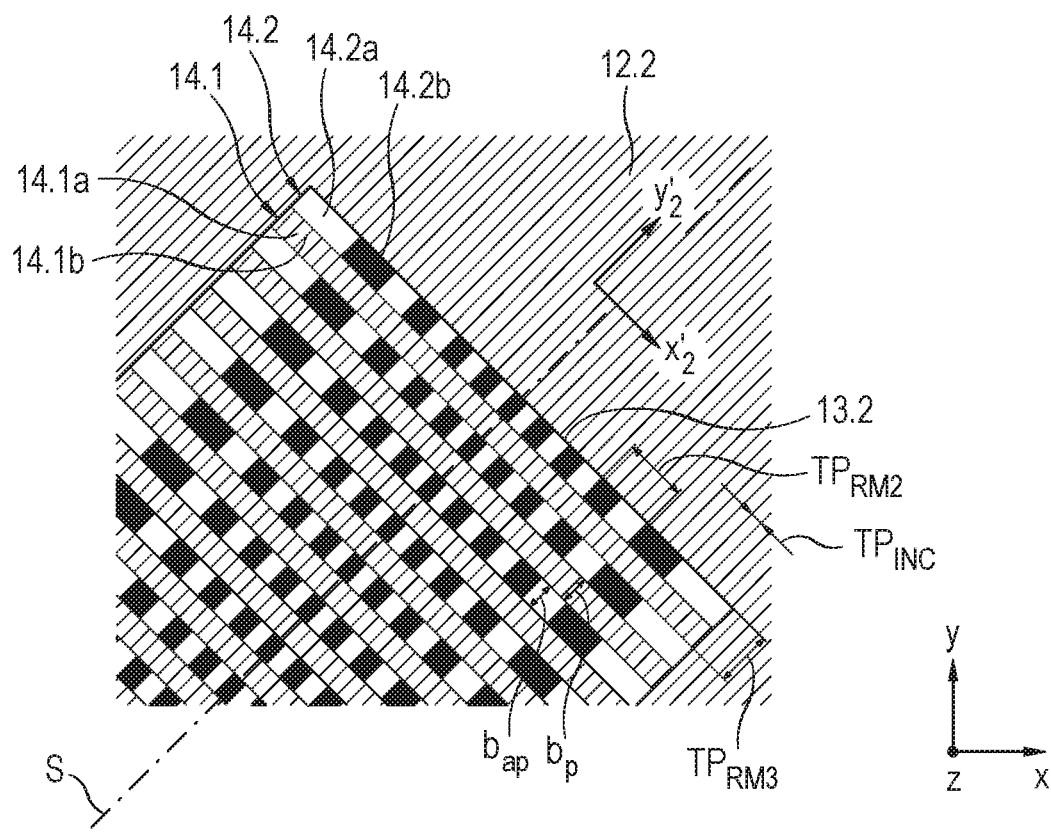
FIG. 3 is a detail view of the scale of FIG. 2.
Figure 4:
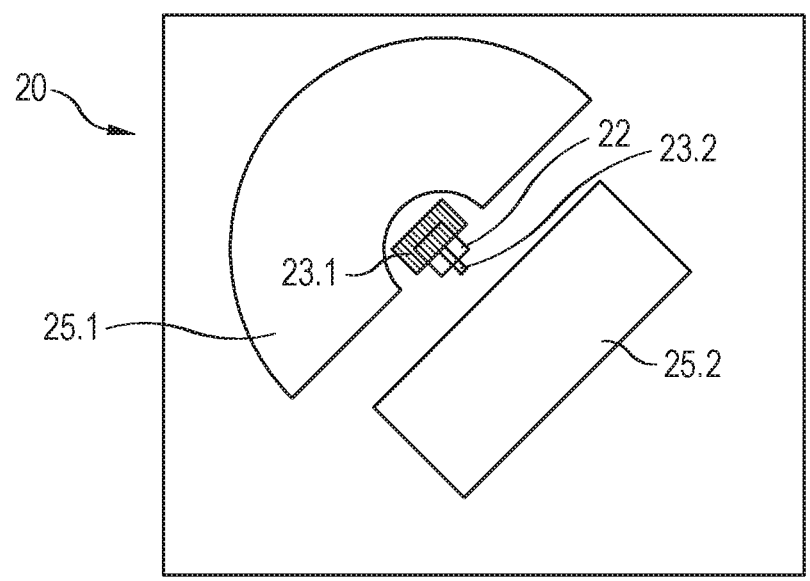
FIG. 4 is a plan view of a scanning unit of the first exemplary embodiment of FIGS. 1a, 1b.

A first exemplary embodiment of the optical position-measuring device according to the present invention will be described in detail below with reference to FIGS. 1a-5. FIGS. 1a, 1b show, in schematic form, the partial scanning beam path in different sectional views; FIG. 2 shows a partial plan view of the scale; FIG. 3 an enlarged detail view of the scale; FIG. 4 a plan view of a scanning unit; and FIG. 5 a detail view of the reference signal detector device In the exemplary embodiment shown, the optical position-measuring device of the present invention takes the form of a reflection-type linear encoder and includes a scanning head having two identically designed scanning units. In FIGS. 1a and 1b, only one of the two scanning units is shown and there denoted by reference numeral 20. The scanning head, and thus the two scanning units 20, is movably disposed relative to a scale 10 along two measurement directions x, y. In the present exemplary embodiment, the two measurement directions x, y are oriented perpendicular to each other. Measurement direction x will hereinafter also referred to as the first or principal measurement direction, and measurement direction y as the second or secondary measurement direction. Scale 10 and the scanning head; i.e. scanning units 20, are connected, for example, to two objects which are movable relative to each other along the two measurement directions x, y. The objects may, for example, be two relatively movable machine parts which are movable primarily along principal measurement direction x over a relatively long measuring distance of up to several meters. Due to guide tolerances, relative movement occurs also along secondary measurement direction y, but typically only a small measuring distance in the range of a few millimeters is to be covered along the secondary measurement direction. A downstream control unit can control the movements of these machine parts in a suitable manner based on the position-dependent output signals of the inventive optical position-measuring device along the two measurement directions x, y, which signals are in the form of incremental signals and reference signals.

In scanning units 20 of the position-measuring device, a light source 22 and, adjacent thereto, a detector assembly including an incremental signal detector 25.1 and a reference signal detector 25.2 are provided on a carrier element 21. A transmitting grating device including a periodic, transmission-type transmitting grating 23.1 and, adjacent thereto, a transmitting slit 23.2 is disposed in front of the divergently emitting light source 22 in the direction of light propagation.

Figure 5:
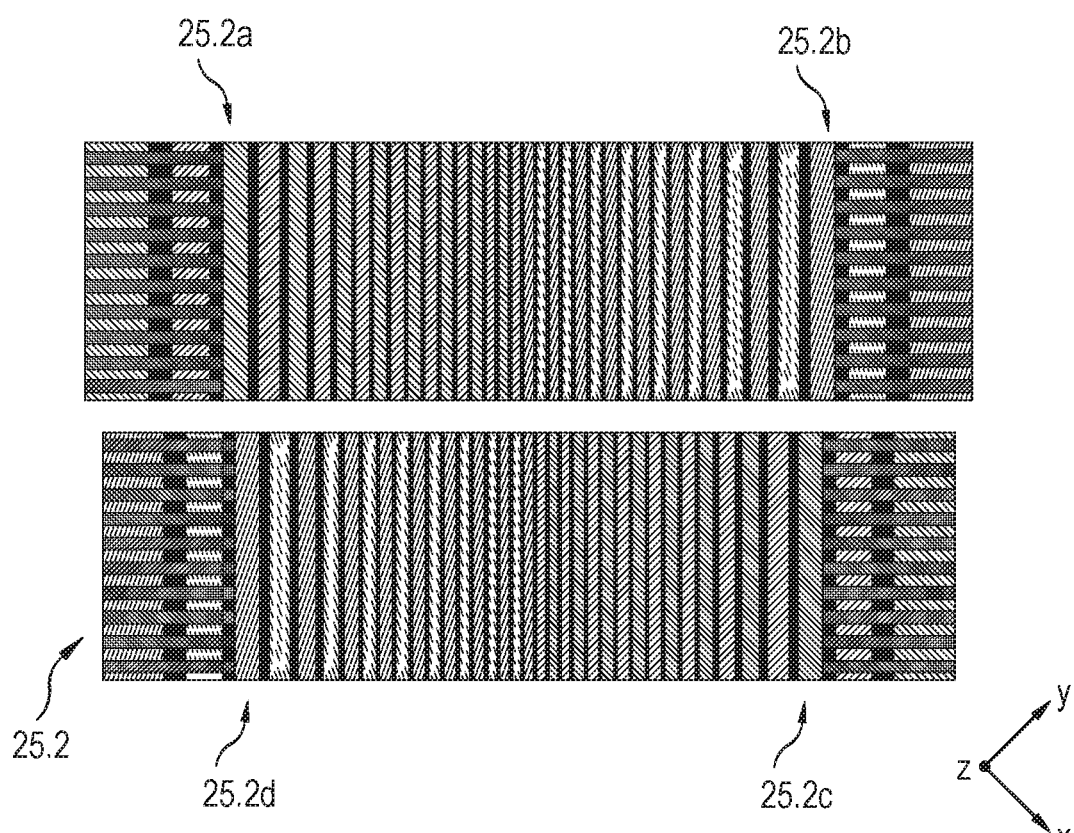
FIG. 5 is a detail view of the reference signal detector device of FIG. 4.

FIG. 5 shows the reference signal detector 25.2 of one scanning unit in an enlarged view. It is composed of a total of four detector arrays 25.2a-25.2d, each of which includes a plurality of rectangular optoelectronic detector elements. For further details regarding the specific design of reference signal detector 25.2, reference is expressly made to the Applicant's patent publications EP 2 525 195 A2, in particular to the exemplary embodiment of FIG. 10.

As a result of the interaction of the light beams emitted by light source 22 with the gratings provided in the scanning beam path; i.e., with transmission-type transmitting grating 23.1, transmitting slit 23.2 and scale 10, a displacement-dependent signal pattern is produced in a detection plane of the detector assembly. By optoelectronically scanning this signal pattern with the aid of first scanning unit 20, periodic incremental signals as well as reference signals are generated along direction $x_1'$, which is hereinafter referred to as incremental graduation direction $x_1$, and with the second scanning unit, periodic incremental signals as well as reference signals are generated along the other incremental graduation direction $x_2'$, which will also be defined hereinafter.

As can be seen from FIG. 2, scale 10 has two tracks disposed on a scale carrier 11, the tracks containing incremental graduations 12.1, 12.2 and extending along first measurement direction x. Incremental graduations 12.1, 12.2 are each composed of line-like graduation regions 12.1a, 12.1b, 12.2a, 12.2b which have different optical properties and are arranged periodically with the incremental graduation grating constant $TP_{INC}$. In the present example of a reflective scale 10, the alternately arranged reflective graduation regions 12.1a, 12.1b, 12.2a, 12.2b have different phase-shifting effects; i.e., different phase shifts. For example, graduation regions 12.1a, 12.1b, 12.2a, 12.2b with a phase shift of 0° and with a phase shift of 180° may be provided alternately. As is apparent from FIG. 2, graduation regions 12.1a, 12.1b, 12.2a, 12.2b are successively arranged in a periodic pattern along respective directions that will hereinafter be referred to as incremental graduation directions $x_1'$ and $x_2'$. In the longitudinal direction, graduation regions 12.1a, 12.1b, 12.2a, 12.2b extend, as shown, along directions $y_1'$, $y_2'$, which are oriented perpendicular to the incremental graduation directions $x_1'$ and $x_2'$, respectively. In the exemplary embodiment shown, incremental graduation directions $x_1'$ and $x_2'$ form an angle $\beta=90°$ relative to each other. Generally, this angle $\beta$ should be selected in the range between 0° and 90°. In accordance with FIG. 2, α denotes, in the two incremental graduations 12.1, 12.2, the angle between the respective incremental graduation direction $x_1'$, $x_2'$ and first measurement direction x. For incremental graduation 12.1, it holds here that $\alpha=45°$, for incremental graduation 12.2, α is selected to be $-45°$. In this exemplary embodiment, an incremental graduation grating constant $TP_{INC}$ of 8 μm is provided.

As can also be seen from FIG. 2, each of the two incremental graduations 12.1, 12.2 has at least one reference mark 13.1, 13.2 integrated therein. Reference marks 13.1, 13.2 make it possible to establish an absolute reference during position measurement. To this end, when the reference mark 13.1, 13.2 is passed over, a counter is, for example, set to a predetermined absolute position value to which the subsequent high-resolution incremental measurement will then be related. From the optical scanning of the reference marks 13.1, 13.2, a respective reference signal can be generated at a defined reference position $x_{REF}$, $y_{REF}$ along the two measurement directions x, y. The variables $x_{REF}$, $y_{REF}$ are merely calculated values, which are selected by the user. The separate counter values of the two tracks can be zeroed or set to a predetermined absolute position value by the reference mark passage. The design of reference marks 13.1, 13.2, which will be described in detail below, allows referencing of the two tracks containing incremental graduations 12.1, 12.2 along both measurement directions x, y to be accomplished merely by a relative movement along first measurement direction x. Likewise, any resulting errors of the incremental signals along the two incremental graduation directions $x_1'$, $x_2'$ can be compensated for by a relative movement of scale 10 and scanning unit 20 along principal measurement direction x alone.

The reference marks 13.1, 13.2 are each disposed in a sub-area of limited extent in the respective incremental graduation 12.1, 12.2. In accordance with the present invention, periodic as well as aperiodic portions of the reference mark 13.1, 13.2 are provided within this sub-area and intermixed therein. Such a design of reference marks 13.1, 13.2 ensures detectability of reference marks 13.1, 13.2 on the one hand, and, on the other hand, ensures that periodic incremental signals will always be available, even when these reference marks 13.1, 13.2 are passed over.

In the exemplary embodiment of FIG. 2, the sub-areas containing reference marks 13.1, 13.2 in incremental graduations 12.1, 12.2 are each rectangular in shape. The longitudinal axes of the two rectangles are oriented perpendicular to incremental graduation directions $x_1'$ and $x_2'$, respectively. In FIG. 2, the respective directions are designated $y_1'$ and $y_2'$, respectively. Furthermore, the dimensions of the sub-area are selected such that the rectangular reference mark 13.1, 13.2 extends across the entire width B of the track containing the respective incremental graduation 12.1, 12.2.

With regard to the specific design of a first exemplary embodiment of a suitable reference mark, reference is made to the partial detail view of reference mark 13.2 in FIG. 3. In this exemplary embodiment, provision is made for the aperiodic and periodic portions 14.2, 14.1 of reference mark 13.2 to be configured spatially separately perpendicularly to incremental graduation direction $x_2'$. In contrast, and alternatively, in an exemplary embodiment that will be described below, provision is made for the periodic portion of the reference mark to be integrated into the aperiodic portion.

Strip-shaped regions having a periodic grating structure with a first reference mark grating constant $TP_{RM1}$ function as periodic portions 14.1 of reference mark 13.2. First reference mark grating constant $TP_{RM1}$ is identical to incremental graduation grating constant $TP_{INC}$ in the surrounding incremental graduation 12.2 of the respective track. The strip-shaped regions extend in reference mark 13.2 along incremental graduation direction $x_2'$. Thus, analogously to the configuration of incremental graduation 12.2, graduation regions 14.1a, 14.1b having different optical properties, here different phase shifts, are arranged within the strip-shaped regions periodically along incremental graduation direction $x_2'$ with first reference mark grating constant $TP_{RM1}=TP_{INC}$.

The aperiodic portion 14.2 of reference mark 13.2, which is spatially separate from periodic portions 14.1, is formed in further strip-shaped regions, where grating structures are arranged which have a second reference mark grating constant $TP_{RM2}$ that varies spatially along incremental graduation direction $x_2'$. In this context, one speaks also of "symmetrically chirped grating structures." Specifically, grating structures composed of alternately arranged graduation regions 14.2a, 14.2b having different optical properties are provided in the strip-shaped regions mirror-symmetrically with respect to a central axis of symmetry S. Within these regions, the second reference mark grating constant $TP_{RM2}$ of the grating structures increases from axis of symmetry S symmetrically outwardly perpendicularly to incremental graduation direction $x_2'$.

With regard to the selection of a suitable chirp pattern and its precise mathematical characterization in such grating structures, reference is additionally made to EP 2 318 812 A1, the disclosure of which is expressly incorporated herein by reference.

In the present exemplary embodiment, the strip-shaped regions containing the periodic portions 14.1 and aperiodic portions 14.2 of reference mark 13.2 have the same width $b_p$, $b_{ap}$ perpendicular to incremental graduation direction $x_2'$; i.e., along direction $y_2'$. Thus, the periodic and aperiodic portions 14.1, 14.2 of reference mark 13.2 have a surface area ratio of 1:1. The signal magnitude ratio of the generated incremental and reference signals can generally be adjusted in a defined manner via the selection of this surface area ratio. Thus, in the example shown, both the periodic portions 14.1 and the aperiodic portions 14.2 of reference mark 13.2 are periodically arranged along direction $y_2'$ with a third reference mark grating constant $TP_{RM3}$. In a possible embodiment, the strip-shaped regions containing the periodic and aperiodic portions 14.1, 14.2 are each selected to have a width $b_p$, $b_{ap}$ of 128 µm, so that the third reference mark grating constant $TP_{RM3}$ is 256 µm.

Furthermore, through selection of a suitable third reference mark grating constant $TP_{RM3}$, it can be ensured that, even in the event of a possible displacement of the scanning unit perpendicular to incremental graduation direction $x_2'$; i.e., along direction $y_2'$, no changes will occur in the incremental and reference signals. In this connection, it is generally advantageous to select as fine a period as possible for third reference mark grating constant $TP_{RM3}$.

Figure 6:
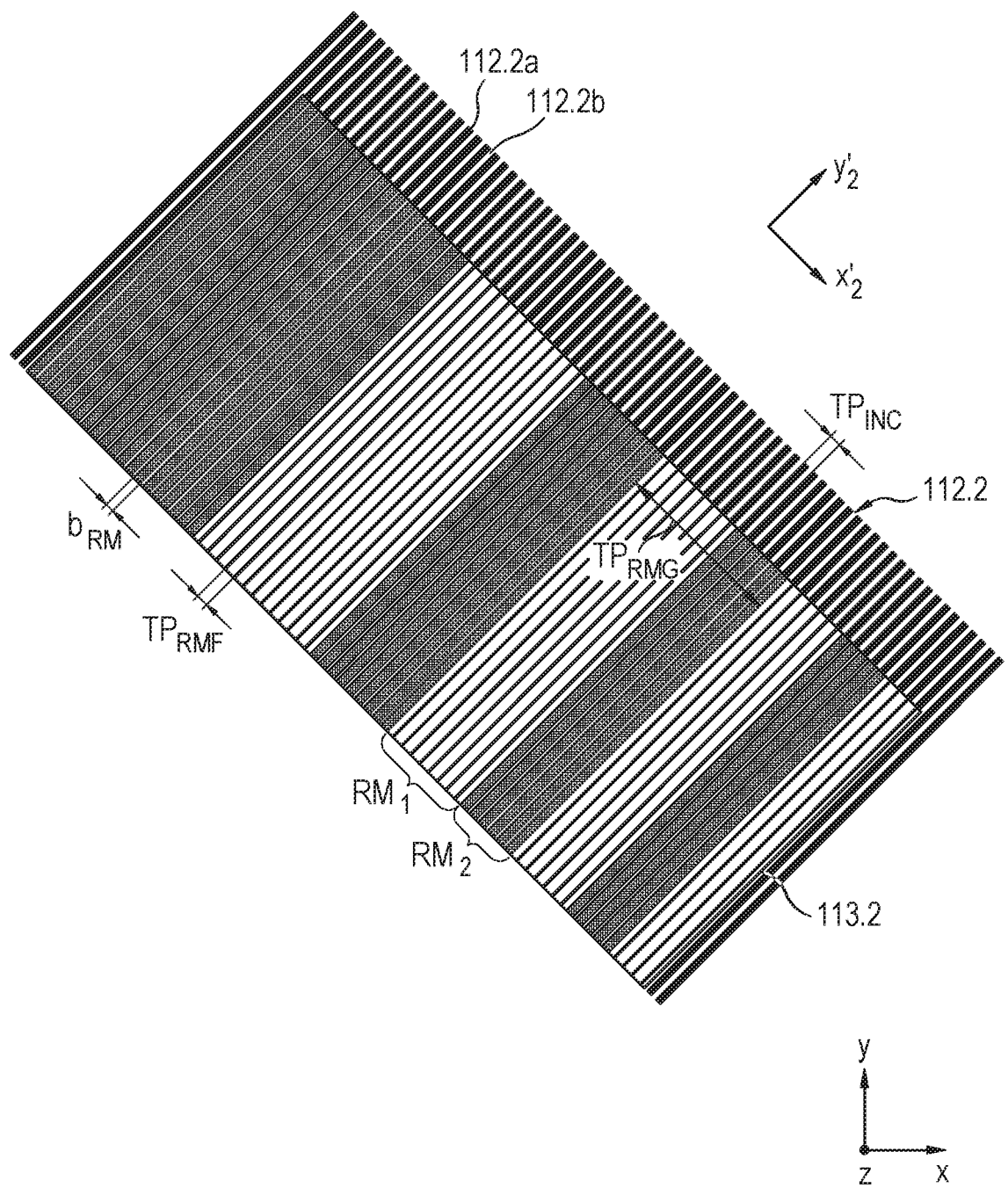
FIG. 6 is a partial view of a scale of a second exemplary embodiment of the optical position-measuring device according to the present invention.

Finally, a second exemplary embodiment of a suitable reference mark will be described with reference to the partial view of reference mark 113.2 in FIG. 6. It should be noted that this figure does not show the entire reference mark. In this exemplary embodiment, provision is made for the periodic portion of the reference mark to be integrated as a periodic superstructure into the aperiodic portion of the reference mark.

As in the previous example, reference mark 113.2 is integrated into an incremental graduation 112.2 having the incremental graduation grating constant $TP_{INC}$. In a possible exemplary embodiment, $TP_{INC}$ is selected to be 8 µm. With regard to the relative arrangement and orientation of the rectangular sub-area containing reference mark 113.2, reference is made to the above explanations.

The periodic portion of the reference mark in the form of a periodic superstructure is formed by a reference mark fine grating constant $TP_{RMF}$ that remains constant along incremental graduation direction $x_2'$ over the entire width of reference mark 113.2. Reference mark fine grating constant $TP_{RMF}$ is equal to incremental graduation grating constant $TP_{INC}$.

In this exemplary embodiment, the aperiodic portion of the reference mark is formed by two different reference mark regions $RM_1$, $RM_2$ arranged alternately along incremental graduation direction $x_2'$ with a reference mark coarse grating constant $TP_{RMG}$. The different reference mark regions $RM_1$, $RM_2$ each have different ratios V of graduation region width $b_{RM}$ to reference mark fine grating constant $TP_{RMF}$. Thus, for example, in reference mark region $RM_1$, a width $b_{RM}$ of 1.6 µm is provided, and thus a ratio $V=b_{RM}/TP_{RMF}=0.2$. In reference mark region $RM_2$, a width $b_{RM}$ of 6.4 µm is provided, and thus a ratio $V=b_{RM}/TP_{RMF}=0.8$ is selected.

The differently configured reference mark regions $RM_1$, $RM_2$ are aperiodically arranged along incremental graduation direction $x_2'$ in reference mark 113.2. Starting at a central axis of symmetry, reference mark regions $RM_1$, $RM_2$ are arranged mirror-symmetrically and in each instance with outwardly increasing reference mark coarse grating constants $TP_{RMG}$.

In addition to the exemplary embodiments specifically described herein, other embodiments are, of course, possible within the scope of the present invention.

For example, rotary position-measuring devices can, of course, also be constructed in accordance with the present invention. In this case, the reference mark of a second track does not result from rotating the reference mark of a first track. This means that, in this case, the reference marks provided in the two tracks are configured differently. Depending on the scanning radius, at least the graduation periods of the periodic portions of the two reference marks must be selected to be different.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An optical position-measuring device for determining the relative position of two objects that are movable relative to one another along at least two measurement directions, the optical position-measuring device comprising:
   two scanning units which are connected to a first one of the two objects and each include at least one light source, one or more gratings and a detector assembly, and a scale which is connected to a second one of the two objects and has two tracks each containing incremental graduations extending along a first one of the measurement directions, the incremental graduations each being composed of graduation regions which have different optical properties and are periodically arranged along an incremental graduation direction, the two incremental graduation directions forming an angle of between 0° and 90° relative to each other, and each of the two incremental graduations having at least one reference mark integrated therein such that scanning of the reference mark allows a reference signal to be generated at a defined reference position along each of the measurement directions, the reference marks including both aperiodic and periodic portions.

2. The optical position-measuring device as recited in claim 1, wherein the reference marks are each disposed in a sub-area of limited extent in the respective incremental graduation, and wherein the aperiodic and periodic portions of the reference marks are intermixed within the sub-area.

3. The optical position-measuring device as recited in claim 2, wherein the sub-area is rectangular in shape, and wherein a longitudinal axis of the rectangle is oriented perpendicular to the respective incremental graduation direction in the respective incremental graduation.

4. The optical position-measuring device as recited in claim 3, wherein the rectangular reference mark extends across the entire width of the respective track containing the respective incremental graduation.

5. The optical position-measuring device as recited in claim 1, wherein the aperiodic and periodic portions of the reference marks are configured spatially separately perpendicularly to the respective incremental graduation direction.

6. The optical position-measuring device as recited in claim 5, wherein:
the periodic portion of the reference marks has a first reference mark grating constant that is identical to the respective incremental graduation grating constant; and
the aperiodic portion of the reference marks in each instance includes a plurality of grating structures having a second reference mark grating constant that varies spatially along the respective incremental graduation direction.

7. The optical position-measuring device as recited in claim 6, wherein the aperiodic portion of the reference marks in each instance includes a plurality of mirror-symmetrically configured grating structures having the second reference mark grating constant which increases from a central axis of symmetry symmetrically outwardly perpendicularly to the respective incremental graduation direction.

8. The optical position-measuring device as recited in claim 5, wherein the aperiodic portions of the reference marks are periodically arranged perpendicularly to the respective incremental graduation direction with a third reference mark grating constant.

9. The optical position-measuring device as recited in claim 8, wherein the third reference mark grating constant is selected such that a displacement of one of the scanning units perpendicular to the incremental graduation direction will not produce a signal change.

10. The optical position-measuring device as recited in claim 5, wherein the periodic and aperiodic portions of the reference marks have a surface area ratio of 1:1.

11. The optical position-measuring device as recited in claim 1, wherein the periodic portion of the reference marks is integrated as a periodic superstructure into the aperiodic portion of the reference mark.

12. The optical position-measuring device as recited in claim 11, wherein:
the periodic portion of the reference marks has a reference mark fine grating constant that is equal to the incremental graduation grating constant of the respective incremental graduation; and
the aperiodic portion of the reference marks is formed by two different reference mark regions which are alternately arranged along the respective incremental graduation direction with a reference mark coarse grating constant and which each have different ratios of graduation region width to the reference mark fine grating constant.

13. The optical position-measuring device as recited in claim 12, wherein the differently configured reference mark regions are aperiodically arranged along the respective incremental graduation direction and, starting at a central axis of symmetry, the reference mark regions are arranged mirror-symmetrically and in each instance with outwardly increasing reference mark coarse grating constants.

14. The optical position-measuring device as recited in claim 1, wherein:
a transmitting grating device is disposed in front of a divergently emitting light source in the scanning units, the transmitting grating device being composed of a periodic transmission-type transmitting grating and a transmitting slit adjacent thereto; and
the detector assembly includes an incremental signal detector and a reference signal detector.

15. The optical position-measuring device as recited in claim 1, wherein the scale is in the form of a reflective scale and has alternately arranged reflective graduation regions having different phase-shifting effects.

* * * * *